United States Patent Office 3,066,661
Patented Dec. 4, 1962

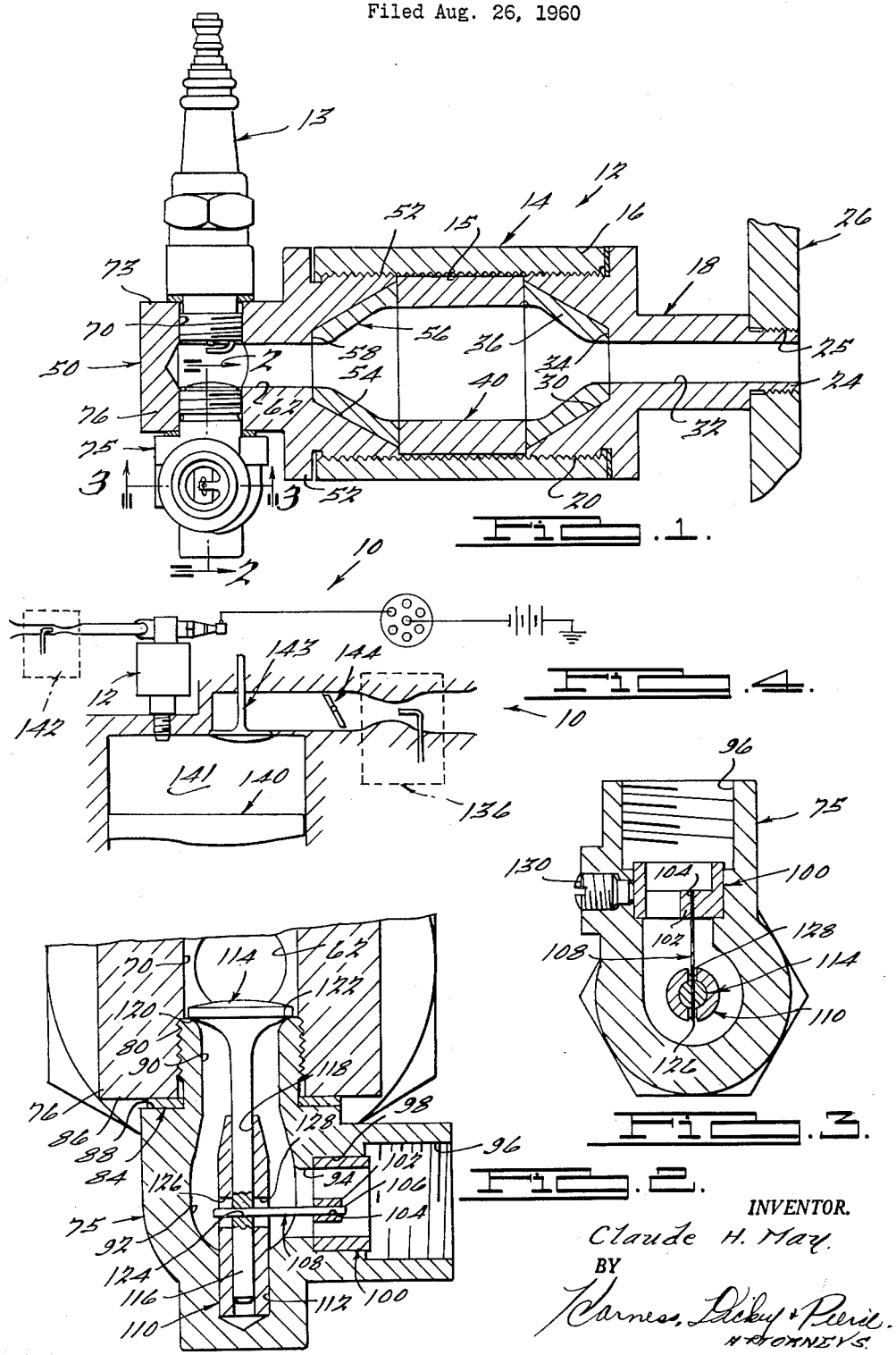

3,066,661
IGNITION DEVICE FOR INTERNAL
COMBUSTION ENGINES
Claude H. May, Racine, Wis., assignor to Walker Manufacturing Company, Racine, Wis., a corporation of Delaware
Filed Aug. 26, 1960, Ser. No. 52,124
1 Claim. (Cl. 123—143)

This invention relates generally to combustion systems for internal combustion engines, and more particularly to an accessory combustion system for addition to a conventional four-stroke cycle internal combustion engine for igniting relatively lean air-fuel mixtures therein.

It is generally accepted that relatively lean air-fuel mixtures result in relatively efficient and complete combustion of the fuel charge. However, it has long been a problem to modify conventional internal combustion engines in such a manner that the advantages inherent in the combustion of such lean air-fuel mixtures can be obtained without deleteriously affecting operation of the engine in other respects.

It has been demonstrated in internal combustion engines heretofore known and used, that extremely lean mixtures, for example, mixtures having an excess of 25 pounds of air to 1 pound of fuel can be ignited and burned to completion when a pilot charge of about 5% of the total fuel is injected into the combustion chamber immediately before a working piston therein reaches top dead center. However, to effect such operation, diesel engine compression ratios are necessary to ignite the pilot spray. Also, the mixture strength of the main mixture must never rise above 25 pounds of air to 1 pound of fuel or self-ignition of the carbureted mixture would produce severe diesel knock. Engines of this type give very efficient combustion, but the specific power output is limited by the relatively small amount of fuel burned per working stroke.

The accessory combustion system of the present invention does not require the aforementioned relatively high compression ratio and therefore is usable with conventional four-cycle spark ignition internal combustion engines. Where the ordinary spark ignited engine inhales varying weights of a constant air-fuel mixture for load and speed control, the combustion system of this invention modifies this condition advantageously to improve economy and reduce nauseous exhaust fumes. The combustion system is relatively easily added to existing internal combustion engines without requiring extensive modification thereof.

In accordance with the present invention, a relatively small auxiliary combustion chamber is inserted in place of the conventional spark plug so as to communicate with the main combustion chamber of the engine. The original spark plug is inserted in a complementary aperture in the auxiliary combustion chamber and functions to ignite a stoichiometric air-fuel mixture therein, as will be described. The auxiliary combusion chamber communicates with the normal combustion chamber of the engine, through a reduced section passage. The chemically correct or stoichiometric pilot mixture of air and fuel is introduced into the auxiliary combustion chamber and is ignited, after compression, no matter how lean the mixture in the main combustion chamber might be. By sizing the volume of the auxiliary combustion chamber so that it contains sufficient fuel to effect idle of the engine, enough mixture is present to torch off relatively lean air-fuel mixtures in the main combustion chamber of the engine under all load conditions.

Accordingly, one object of the present invention is an improved combustion system for an internal combustion engine.

Another object is a combustion system that can be relatively easily added to existing internal combustion engines.

Another object is a combustion system wherein a stoichiometric air-fuel mixture is ignited by a conventional spark plug to effect ignition of a relatively lean air-fuel mixture.

Other objects and advantages of the present invention will become apparent from the following description wherein reference is made to the drawings in which:

FIGURE 1 is a sectional side view of an auxiliary combustion chamber in accordance with an exemplary embodiment of the present invention;

FIG. 2 is a cross-sectional view taken generally along the line 2—2 of FIGURE 1;

FIG. 3 is a cross-sectional view taken generally along the line 3—3 of FIG. 1; and FIG. 4 is a diagrammatic view showing the auxiliary combustion chamber in association with an internal combustion engine.

The combustion system of the present invention comprises an auxiliary combustion chamber that communicates with the main combustion chamber of an internal combustion engine through a restricted throat. The auxiliary combustion chamber contains a small automatic valve for the admission of a pilot charge and a conventional spark plug to effect ignition of the pilot charge. The pilot charge is a mixture of approximately stoichiometric proportions that is provided by a relatively simple and small carburetor. The size of the charge is sufficient to effect idling of the engine at which time no air-fuel mixture is supplied to the engine through the main carburetor thereof. The main carburetor is throttled and the auxiliary carburetor is unthrottled. When an increase in power is demanded from the engine, the main carburetor throttle is opened and either a richer mixture or a greater weight of lean mixture is admitted through the main intake valve. Under part-load conditions, a relatively lean mixture is fed to the main combustion chamber and a near-stoichiometric mixture to the auxiliary combustion chamber. Even with an abnormally lean mixture, for example, 30–50 pounds of air to 1 pound of fuel, the heat release from the combustion of the pilot charge will be sufficient to ignite the lean charge in the main combustion chamber because, as the working piston passes top dead center, the burning pilot charge is injected at relatively high velocity through the neck of the auxiliary combustion chamber into the main working cylinder and, unlike a spark plug, constitutes a multiple ignition source of sufficient heat value to effect ignition of the relatively lean main charge.

The auxiliary valve in the auxiliary combustion chamber is opened by the depression created in the working cylinder during the induction stroke. During the compression stroke, the relatively rich charge in the auxiliary combustion chamber is compressed and at the time spark ignition thereof occurs, is stratified so as to be approximately stoichiometric at the top of the auxiliary combustion chamber and of approximately the same mixture strength as the main combusion chamber near the throat thereof. The shape of the auxiliary combustion chamber and of the throat thereof influences the degree of mixing of the relatively lean and rich charges.

More particularly, a combustion system 10 in accordance with the present invention, comprises an auxiliary combustion chamber 12 wherein a pilot fuel charge of stoichiometric proportions is ignited by a conventional spark plug 13. The auxiliary combustion chamber 12 comprises a tubular member 14 having a threaded internal surface 15 for the acceptance, at one end 16 thereof, of an adapter 18. The adapter 18 has an externally threaded inner end portion 20 complementary to the threads 15 on the tubular member 14 so as to be threadably engageable therewith. The adapter 18 has an externally threaded outer end portion 24 that is acceptable in a spark plug aperture 25 in a cylinder head 26 of a conventional internal combustion engine (not shown).

The adapter 18 has a conical bore 30 leading into an axial bore 32 in the end portion 24 thereof for the passage of a burning air-fuel mixture into the main combustion chamber of the engine, as will be described. The conical bore 30 terminates in a radial flange 34 for the seating of a complementary conical combustion chamber liner 36. A tubular combustion chamber liner 40 is accepted within the internal confines of the tubular portion 14 of the auxiliary combustion chamber 12 to preclude excessive heating thereof.

A spark plug housing 50 having an externally threaded end portion 52 complementary to the threaded internal wall 15 of the tubular housing 12 is threadably engaged with the housing 12. The end portion 52 of the housing 50 has a conical bore 54 therein for the acceptance of a complementary conical liner 56. The liner 56 is seated on a radial shoulder 58 of the bore 54.

The housing 50 has a central bore 62 communicating with the bore 54 and with a threaded transverse bore 70. The spark plug 13 is accepted in one end 73 of the bore 70 and a valve housing 75 at the other end 76 thereof.

An externally threaded end portion 80 of the valve housing 75 is threadably engaged in the end portion 76 of the spark plug housing 50. A suitable sealing washer 84 is interposed between an end face 86 on the housing 50 and a radial shoulder 88 on the valve housing 75 to effect a fluid seal therebetween.

The valve housing 75 has a central bore 90 extending into an expanded inlet cavity 92 that communicates with a transverse passage 94. The transverse passage 94 has an outer internally threaded counterbore 96 for the acceptance of a suitable fluid conduit (not shown) and an inner counterbore 98 for the acceptance of a spring support member 100.

The spring support 100 is of annular configuration with a radially inwardly extending finger 102 having an axial bore 104 therein for the support of an end portion 106 of a cantilevered valve spring 108. It is to be noted that the finger 102 of the spring support 100 is not a true radius thereof and, as best seen in FIG. 2, is displaced so that the center line of the bore 104 thereof, and therefore of the spring 108, is displaced from the central axis of the spring support 100, for a reason to be discussed.

A tubular valve sleeve 110 is supported in a vertical bore 112 that is coaxial with the bore 90 in the valve housing 75 for the support of an inlet valve 114. A downwardly extending stem portion 116 of the valve 114 extends into a central bore 118 of the valve sleeve 110, for slidable movement axially thereof. The valve 114 has a conical valve surface 120 adapted to be seated on a complementary conical valve seat 122 in the upper end portion 80 of the valve support 75. The valve 114 is biased into seating engagement against the valve seat 122 by the cantilevered valve spring 108, the spring 108 extending through a transverse bore 124 in the valve stem 116 and through a pair of diametrically opposed longitudinally extending slots 126 and 128 in the valve sleeve 110. The slots 126 and 128 provide for longitudinal movement of the valve spring 108 as the valve 114 moves axially of the valve sleeve 110.

As best seen in FIG. 3, the valve spring support 100 is locked in a rotative position with respect to the valve housing 75 as by a set screw 130. Rotation of the valve spring support 100 with respect to the valve housing 75 changes the bias of the spring 108 on the valve 114 and therefore the bias of the valve 114 on the valve seat 122 of the valve support 75, thereby to vary the pressure differential across the valve 114 required to open the valve 114 upon the induction stroke of a working cylinder, as will be described.

Installation of the auxiliary chamber 12 on a conventional internal combustion engine requires only minor modification of the carburetor 136 thereof primarily to lean the resulting mixture therefrom to obtain the aforementioned operational advantages.

Referring to FIG. 4, as a piston 140 of a conventional internal combustion engine starts on its intake stroke, a partial vacuum is induced in a main combustion chamber 141 thereof and in the auxiliary combustion chamber 12, causing the valve 114 to open against the bias of the spring 108. A chemically correct mixture of air and fuel from an auxiliary carburetor 142 is drawn into the auxiliary combustion chamber 12, a small portion thereof passing through the constricted bore 32 into the main combustion chamber 141 of the engine, thus scavenging the auxiliary combustion chamber 12 of exhaust gases. A relatively lean mixture is drawn through a main inlet valve 143 of the engine from the main carburetor 136, the weight of the mixture being determined by the load on the engine. As the engine cycle progresses to its compression stroke, the relatively lean mixture in the main combustion chamber 141 is compressed as is the relatively rich mixture in the auxiliary combustion chamber 12, relatively little mixing occurring therebetween. Near the end of the compression stroke, the spark plug 13 effects ignition of the stoichiometric mixture compressed in the region thereof causing the mixture to burn rapidly, raising the pressure in the auxiliary combustion chamber 12 above that in the main combutsion chamber 141 and reversing the mass flow back into the main combustion chamber 141 from the auxiliary combustion chamber 12. This back-flow consists of a burning, torch-like jet that effectively ignites the lean mixture in residence in the main combustion chamber 141, causing relatively complete combustion thereof.

The power output of the engine is controlled by the main carburetor 136 by controlling either the air-fuel ratio of the lean mixture or the amount of lean mixture admitted into the combustion chamber as by a throttle 144 (FIG. 4).

Tests indicate that use of the combustion system 10 of the present invention results in relatively complete, highly efficient combustion. Idle of the internal combustion engine is very regular and easy. The analysis of the products of combustion shows very lean overall mixture, far leaner than would be considered operable in engines heretofore known and used.

It is to be understood that the specific construction of the improved combustion system herein disclosed and described is presented for the purpose of explanation and illustration and is not intended to indicate limits of the invention, the scope of which is defined by the following claims.

What is claimed is:

A combustion system for operating an internal combustion engine having a main combustion chamber, said system comprising an elongated generally cylindrical auxiliary combustion chamber having an end portion engageable in the spark plug aperture of the main combustion chamber and communicating therewith through a passage of reduced cross section, means for supplying a stoichiometric air-fuel mixture to said auxiliary combustion chamber irrespective of the load on said engine, a reciprocable valve in said auxiliary combustion chamber on the opposite side thereof from said passage for controlling the flow of the stoichiometric air-fuel mixture thereinto, a spark plug in said auxiliary chamber on the opposite end thereof from said passage, means for supplying a relatively lean air-fuel mixture to the main combustion chamber to effect ignition of said stoichiometric mixture by torching off said relatively lean mixture in the working cylinder through said passage, said valve being normally biased to a closed position by a cantilevered spring having one end portion engaged with said valve and the other end portion secured to a rotatable adjustment member the central axis of which extends generally normally to the direction of reciprocation of said valve, said valve spring extending generally parallel to but spaced from the central axis of the rotatable adjustment member so that upon rotation thereof the other end portion of said spring is moved relative to said one end portion to adjust the bias thereof on said valve.

References Cited in the file of this patent

UNITED STATES PATENTS

| | | |
|---|---|---|
| 1,271,942 | Ricardo | July 9, 1918 |
| 1,504,322 | Brush | Aug. 12, 1924 |
| 1,882,513 | McElhinney | Oct. 11, 1932 |
| 1,957,541 | Johnson | May 8, 1934 |
| 2,098,875 | Mallory | Nov. 9, 1937 |
| 2,156,665 | Mallory | May 2, 1939 |
| 2,690,741 | Broderson | Oct. 5, 1954 |